(12) United States Patent
Yang et al.

(10) Patent No.: US 10,871,694 B2
(45) Date of Patent: Dec. 22, 2020

(54) BISTABLE CHOLESTERIC LIQUID CRYSTAL SWITCHABLE WINDOW

(71) Applicant: Kent State University, Kent, OH (US)

(72) Inventors: Deng-Ke Yang, Hudson, OH (US); Meina Yu, Kent, OH (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 16/332,107

(22) PCT Filed: Sep. 11, 2017

(86) PCT No.: PCT/US2017/050884
§ 371 (c)(1),
(2) Date: Mar. 11, 2019

(87) PCT Pub. No.: WO2018/049294
PCT Pub. Date: Mar. 15, 2018

(65) Prior Publication Data
US 2019/0361284 A1 Nov. 28, 2019

Related U.S. Application Data

(60) Provisional application No. 62/385,282, filed on Sep. 9, 2016.

(51) Int. Cl.
*G02F 1/137* (2006.01)
*C09K 19/58* (2006.01)
*G02F 1/1343* (2006.01)

(52) U.S. Cl.
CPC ........ *G02F 1/13718* (2013.01); *C09K 19/586* (2013.01); *G02F 1/1343* (2013.01)

(58) Field of Classification Search
CPC .......................... G02F 1/13718; G02F 1/1343
See application file for complete search history.

(56) References Cited

U.S. PATENT DOCUMENTS

| | | | |
|---|---|---|---|
| 4,909,605 A | 3/1990 | Asano et al. | |
| 6,133,895 A * | 10/2000 | Huang | G09G 3/3629 345/94 |
| 8,325,125 B2 * | 12/2012 | Shingai | G09G 3/3629 345/208 |
| 2003/0034945 A1 * | 2/2003 | Mi | G02F 1/13718 345/89 |
| 2006/0164351 A1 * | 7/2006 | Hsu | G02F 1/1391 345/87 |
| 2007/0290975 A1 * | 12/2007 | Gan | G09G 3/3629 345/94 |
| 2008/0002121 A1 * | 1/2008 | Jakli | G02F 1/1393 349/129 |
| 2009/0290078 A1 * | 11/2009 | Yang | G02F 1/13718 349/16 |

(Continued)

*Primary Examiner* — Jia X Pan
(74) *Attorney, Agent, or Firm* — Fay Sharpe LLP (57) ABSTRACT

A bistable cholesteric liquid crystal switchable window has two stable states in the absence of an applied voltage. A first stable state is a planar state which is transparent or reflective for visible light. A second stable state is a focal conic state which is opaque for visible light. The window can be switched from the first stable state to the second stable state via a first voltage pulse and from the second stable state to the first stable state via a second voltage pulse. The first voltage pulse and the second voltage pulse may have the same frequency.

20 Claims, 3 Drawing Sheets

(56) References Cited

U.S. PATENT DOCUMENTS

| | | | |
|---|---|---|---|
| 2010/0002155 A1* | 1/2010 | Yamaguchi | G02F 1/13718 349/12 |
| 2010/0194793 A1* | 8/2010 | Uehara | G09G 3/20 345/691 |
| 2010/0245726 A1 | 9/2010 | Utsumi et al. | |
| 2011/0122115 A1* | 5/2011 | Nose | G09G 3/36 345/211 |
| 2011/0316891 A1* | 12/2011 | Uehara | G09G 3/3622 345/690 |
| 2013/0050598 A1* | 2/2013 | Uehara | G02F 1/13306 349/33 |
| 2016/0033806 A1* | 2/2016 | Lavrentovich | G02F 1/13718 349/33 |
| 2016/0252755 A1 | 9/2016 | Lavrentovich et al. | |

* cited by examiner

BISTABLE CHOLESTERIC LIQUID CRYSTAL SWITCHABLE WINDOW

CROSS-REFERENCE TO RELATED APPLICATIONS

This application is a National Stage Entry of International Application No. PCT/US2017/050884, filed Sep. 11, 2017, and entitled "Bistable Cholesteric Liquid Crystal Switchable Window"; which claims priority to U.S. Provisional Application Ser. No. 62/385,282, filed Sep. 9, 2016, and entitled "Bistable Cholesteric Liquid Crystal Switchable Window", the contents of which are incorporated herein by reference.

BACKGROUND

The present disclosure relates to a bistable cholesteric liquid crystal switchable window having two stable states in the absence of an applied voltage. In particular, it is possible to switch between the two stable states in both directions by applying a voltage pulse having the same frequency.

The state-of-the-art switchable window is the polymer stabilized cholesteric texture (PSCT) switchable window (or light shutter) which is made from a composite of a cholesteric liquid crystal and a polymer. The material is sandwiched between two parallel substrates (e.g., glass plates and/or plastic films) with transparent electrodes. An electric voltage is applied to the electrodes to switch the PSCT material. The PSCT material can be operated in three modes: normal mode, reverse mode, and bistable mode. The normal mode PSCT switchable window is in the opaque focal conic state in the absence of an applied voltage, and is switched to the transparent homeotropic state when a voltage is applied. The reverse mode PSCT switchable window is in the transparent planar state in the absence of an applied voltage, and is switched to opaque focal conic state when a voltage is applied. These two modes have the problem that that a voltage must be applied to sustain one of the optical states. The window will consume a lot of energy when a voltage must be applied for prolonged periods. The bistable mode PSCT switchable window has two stable states in the absence of an applied voltage. One of the bistable states is the transparent homeotropic state. The other bistable state is the opaque focal conic state. The material has a positive dielectric anisotropy when an AC voltage with a low frequency is applied and has a negative dielectric anisotropy when an AC voltage with a high frequency is applied. The bistable PSCT window switched from the transparent state to the opaque state by using an AC voltage pulse with a low frequency, and is switched from the opaque state back to the transparent state by using another AC voltage pulse with a high frequency. This bistable mode has the problem that voltage pulses with different frequencies must be used, which makes the driving circuitry expensive. Furthermore, the frequencies change with ambient temperature.

It would be desirable to provide a bistable liquid crystal switchable window wherein it is possible to switch between two stable states by applying voltage pulses wherein the voltage pulses for switching from the first state to the second state and from the second state to the first state have the same frequency.

BRIEF DESCRIPTION

The present disclosure relates to bistable cholesteric liquid crystal switchable windows having two stable states in the absence of an applied voltage.

Disclosed in some embodiments is a bistable cholesteric liquid crystal switchable window having two stable states in the absence of an applied voltage.

A first stable state is a planar state which is transparent or reflective for visible light. A second stable state is a focal conic state which is opaque for visible light.

The bistable window can be switched from the first stable state to the second stable state by a first voltage pulse.

The bistable window can be switched from the second stable state to the first stable state by a second voltage pulse.

The first voltage pulse has a first frequency, the second voltage pulse has a second frequency, and a difference between the first frequency and the second frequency is less than 2000 Hz.

In some embodiments, the bistable cholesteric liquid crystal switchable window includes a liquid crystal layer between two electrodes, wherein the liquid crystal layer comprises a liquid crystal.

The two electrodes may be indium tin oxide electrodes.

In some embodiments, the liquid crystal has twist and bend elastic constants which have a relative difference of less than 30%.

The liquid crystal layer may further include an elastic constant adjuster and a chiral dopant.

In some embodiments, the elastic constant adjuster is a dimer.

The dimer may be 1"7"-bis(4-cyanobiphenyl-4'-yl) heptane.

In some embodiments, the elastic constant adjuster and the chiral dopant control the transmittance of the scattering focal conic state.

The elastic constant adjuster may have a small bend elastic constant of less than 130% of the twist elastic constant.

In some embodiments, the elastic constant adjuster is a liquid crystal with a bent molecular shape.

The elastic constant adjuster and the chiral dopant control the transmittance of the transparent planar state.

In some embodiments, the bistable cholesteric liquid crystal switchable window further includes alignment layers between the two electrodes and the liquid crystal layer.

The alignment layers may include a polyimide.

In some embodiments, the first voltage pulse and the second voltage pulse have the same pulse width.

The pulse width may be about 0.5 seconds.

In some embodiments, the liquid crystal layer comprises from about 45 wt % to about 65 wt % of the liquid crystal, from about 20 wt % to about 40 wt % of a dimer, and from about 5 wt % to about 25 wt % of a chiral dopant.

The liquid crystal layer may include from about 50 wt % to about 60 wt % of the liquid crystal, from about 25 wt % to about 35 wt % of a dimer, and from about 10 wt % to about 20 wt % of a chiral dopant.

In some embodiments, the liquid crystal layer comprises about 55 wt % of the liquid crystal, about 29 wt % of a dimer, and about 15 wt % of a chiral dopant.

The first voltage pulse and the second voltage pulse may have different pulse widths.

Disclosed in other embodiments is a bistable cholesteric liquid crystal switchable window having two stable states in the absence of an applied voltage.

A first stable state is a planar state which is transparent or reflective for visible light.

A second stable state is a focal conic state which is opaque for visible light.

The bistable window can be switched from the first stable state to the second stable state by a first voltage pulse.

The bistable window can be switched from the second stable state to the first stable state by a second voltage pulse.

The first voltage pulse and the second voltage pulse have the same frequency.

In some embodiments, the window includes a liquid crystal layer between two electrodes, wherein the liquid crystal layer comprises a liquid crystal.

The two electrodes may be indium tin oxide (ITO) electrodes.

In some embodiments, the liquid crystal layer further comprises a dimer and a chiral dopant.

The dimer may be 1″7″-bis(4-cyanobiphenyl-4'-yl) heptane.

In some embodiments, the window further includes alignment layers between the two electrodes and the liquid crystal layer.

The alignment layers may include a polyimide.

In some embodiments, the first voltage pulse and the second voltage pulse have the same pulse width. In other embodiments, the first voltage pulse and the second voltage pulse have different pulse widths.

The pulse width may be about 0.5 seconds.

In some embodiments, the liquid crystal layer comprises from about 45 wt % to about 65 wt % of the liquid crystal, from about 20 wt % to about 40 wt % of a dimer, and from about 5 wt % to about 25 wt % of a chiral dopant.

The liquid crystal layer may include from about 50 wt % to about 60 wt % of the liquid crystal, from about 25 wt % to about 35 wt % of a dimer, and from about 10 wt % to about 20 wt % of a chiral dopant.

In some embodiments, the liquid crystal layer comprises about 55 wt % of the liquid crystal, about 29 wt % of a dimer, and about 15 wt % of a chiral dopant.

In some embodiments, a dimer is used to reduce the defects in the transparent state and to increase the transmittance of the transparent state.

Disclosed in further embodiments is a method for operating a bistable cholesteric liquid crystal switchable window. The method includes applying a first voltage to the window; turning off the first voltage, and applying a second voltage to the window.

The application of the first voltage changes the window from a first transparent or reflective state to an opaque state.

The application of the second voltage changes the window from the opaque state to a second transparent or reflective state.

The first voltage and the second voltage are the same or different.

The first voltage is applied at a first frequency.

The second voltage is applied at a second frequency.

An absolute value of the difference between the first frequency and the second frequency is less than 2000 Hz.

In some embodiments, the first voltage and the second voltage are the same. In other embodiments, the first voltage and the second voltage are different.

The first voltage and the second voltage may be applied at the same frequency or different frequencies.

The first voltage has a first pulse width and the second voltage has a second pulse width.

In some embodiments, the first pulse width and the second pulse width are the same.

In other embodiments, the first pulse width and the second pulse width are different.

In some embodiments, the first voltage exceeds the second voltage.

In other embodiments, the second voltage exceeds the first voltage.

In further embodiments, the first voltage and the second voltage are equal to each other.

In some embodiments, the first frequency exceeds the second frequency.

In other embodiments, the second frequency exceeds the first frequency.

In further embodiments, the first frequency and the second frequency are equal to each other.

In some embodiments, the first pulse width exceeds the second pulse width.

In other embodiments, the second pulse width exceeds the first pulse width.

In further embodiments, the first pulse width and the second pulse width are equal to each other.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1a illustrates a transparent planar state. FIG. 1c illustrates an opaque focal conic state. FIGS. 1b and 1d illustrate states during the application of a voltage.

DETAILED DESCRIPTION

A more complete understanding of the devices and methods disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. In the following specification and the claims which follow, reference will be made to a number of terms, which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing devices or methods as "consisting of" and "consisting essentially of" the enumerated components/steps, which allows the presence of only the named components/steps, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable.

The term "about" can be used to include any numerical value that can vary without changing the basic function of that value. When used with a range, "about" also discloses the range defined by the absolute values of the two endpoints. The term "about" may refer to plus or minus 10% of the indicated number.

The bistable cholesteric liquid crystal switchable windows of the present disclosure were created by controlling the elastic constants of the liquid crystal. The bistable switchable windows have two stable states in the absence of an applied voltage. One of the bistable states is the planar state which is transparent (or reflective) for visible light. The other bistable state is the focal conic state which is opaque for visible light. The bistable window can be switched from the transparent state to the opaque state by a voltage pulse, and can be switched from the opaque state back to the transparent state by another voltage pulse. The frequencies of the voltage pulses may be the same or close to each other, which greatly reduces the cost of driving electronic circuitry and makes it possible for the bistable window to be used in a wide temperature region. Additionally, no voltage has to be applied to sustain the optical states, and therefore this switchable window saves energy.

One non-limiting example of a bistable cholesteric liquid crystal switchable window includes: two stable states in the absence of an applied voltage; wherein a first stable state is a planar state which is transparent or reflective for visible light; wherein a second stable state is a focal conic state which is opaque for visible light; wherein the bistable window can be switched from the first stable state to the second stable state by a first voltage pulse; wherein the bistable window can be switched from the second stable state to the first stable state by a second voltage pulse; and wherein the first voltage pulse has a first frequency, the second voltage pulse has a second frequency, and an absolute value of the difference between the first frequency and the second frequency is less than 2000 Hz.

Cholesteric liquid crystals (CLCs) possess a helical structure in which elongated liquid crystal molecules twist spatially around an orthogonal axis known as the helical axis. The distance over which for the molecules twist 360° is the helical pitch and denoted by P. The optical property of a CLC sandwiched between two parallel substrates depends on the direction of the helical axis with respect to the substrates. It exhibits three textures (states) with different optical properties due to different orientations of the helical axis, as shown in FIG. 1.

Figure 1:
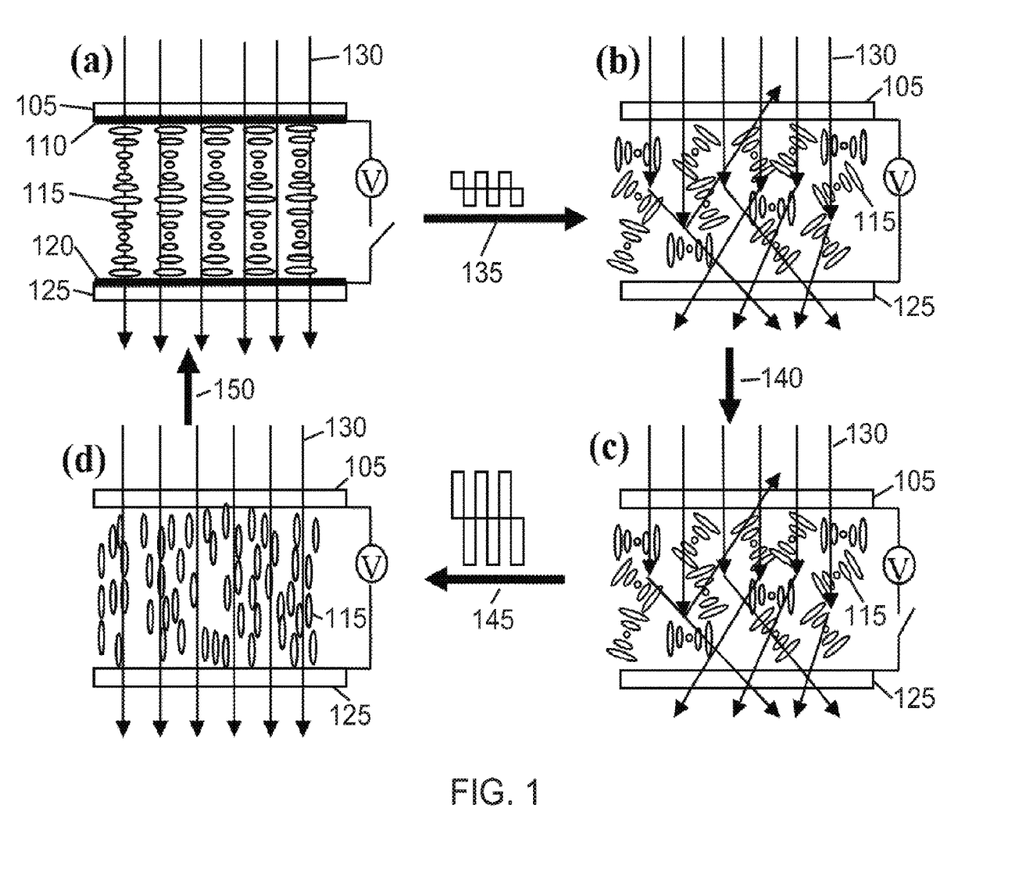
FIGS. 1a-1d are schematic diagrams showing the operation of a bistable liquid crystal switchable window in accordance with some embodiments of the present disclosure.

In FIG. 1, the illustrated system includes a first substrate 105, a first electrode 110, liquid crystals 115, a second electrode 120, and a second substrate 125. Arrows 130 designate the paths of light. The illustrated steps include applying a first voltage 135, turning off the first voltage 140, applying a second voltage 145, and turning off the second voltage 150. The second voltage may be greater than the first voltage.

The first texture is the planar texture in which the helical axis is perpendicular to the substrates, as shown in FIG. 1a, and the liquid crystal reflects light at the wavelength $\lambda=[(n_e+n_o)/2]P$ with the bandwidth $\Delta\lambda=(n_e-n_o)P$, where $n_e$ and $n_o$ are the extraordinary and ordinary refractive indices of the liquid crystal, respectively. If the reflection peak is out of the visible light region and there are no defects, the planar state is transparent for visible light. The second state is the focal conic state in which the liquid crystal forms a poly-domain structure with the helical axis varying randomly from domain to domain, as shown in FIG. 1b, and the liquid crystal is optically scattering, namely, opaque. The third state is the homeotropic state in which the helical structure is unwound by externally applied voltages, with the liquid crystal molecules aligned perpendicular to the substrate, and the liquid crystal becomes transparent.

CLCs can be switched between the states. The switching depends on their dielectric anisotropy and elastic constants. For a CLC with a positive dielectric anisotropy, it can be switched from the transparent planar state to the opaque focal conic state by a low voltage as shown in FIG. 1. When the applied voltage is removed, the CLC will remain in this state if there is no strong homogeneous alignment layer on the inner surface of the substrates. If a high voltage is applied, the CLC is switched to the homeotropic state. When the applied voltage is removed, the CLC will relax back to an intermediate state, called transient planar state, and then to the planar state. The transient state is not stable and has a pitch around $P'=(K_{33}/K_{22})P$, where $K_{22}$ and $K_{33}$ are the twist elastic constant and bend elastic constant of the liquid crystal, respectively. For a regular CLC, $K_{33}>K_{22}$, and there are many defects in the planar state. The defects in the planar state scatter light and make the material hazy. Although both the planar and focal conic states are stable in the absence of applied voltage, the CLC is not suitable for switchable windows because of the defects in the planar state.

The CLC compositions of the present disclosure have a twist elastic constant $K_{22}$ and a bend elastic constant $K_{33}$ that are close each other, and may be useful for bistable switchable windows. The CLCs are made from regular CLC and special materials, such as dimers, which enable small bend elastic constants. When a regular CLC and a special material are mixed with proper concentrations, it forms a CLC whose twist and bend elastic constants are close to each other. This CLC may be referred to as an elastic-constant matched cholesteric liquid crystal (EMCLC). The EMCLC also has a positive dielectric anisotropy.

The EMCLCs of the present disclosure can be sandwiched between two parallel substrates with transparent electrode(s). It has two stable states in the absence of applied voltage. One of the bistable states is the transparent planar state. The other bistable state is the opaque focal conic state. It can be switched from the transparent planar state to the opaque focal conic state by applying a low voltage. It will remain in the opaque focal conic state when the applied voltage is removed. It can be switched from the opaque focal conic state back to the transparent planar state by applying a high voltage. During the time when the high voltage is applied, it is switched to the homeotropic state. When the applied high voltage is removed, it relaxes directly to the transparent planar state. Such obtained planar state has no defect and has ultrahigh transmittance.

The windows of the present disclosure find use in many industries and applications. The windows may be particularly useful for privacy control and energy flow control.

Non-limiting examples of liquid crystals include the E-series and BL-series liquid crystals (commercially available from Merck).

In some embodiments, the E-series liquid crystal includes one or more of E7, E44, and E48.

In some embodiments, the BL-series liquid crystal includes one or more of BL003, BL006, and BL038.

In some embodiments, the liquid crystal component includes a cyano-biphenyl material.

In some embodiments, the liquid crystal component includes a cyano-terphenyl material.

In some embodiments, the liquid crystal component includes a mixtures of at least one cyano-biphenyl material and at least one cyano-terphenyl material.

In some embodiments, the liquid crystal component includes only one type of liquid crystal material.

In other embodiments, the liquid crystal component includes a plurality of distinct liquid crystal materials.

The plurality may include two, three, four, five, six, seven, eight, nine, ten, or more liquid crystal materials.

In more particular embodiments, the liquid crystal component includes at least two different liquid crystal materials. The ratio (by weight) of the first liquid crystal material to the second liquid crystal material may be in the range of about 1:99 to about 99:1, including from about 10:90 to about 90:10, about 20:80 to about 80:20, about 70:30 to about 30:70, about 40:60 to about 60:40, about 45:55 to about 55:45, and about 50:50.

Non-limiting examples of elastic constant adjuster materials include dimers and bent-core liquid crystals. Bent-core liquid crystals may also be referred to as banana-shaped liquid crystals.

Non-limiting examples of materials which may be used in the electrodes of the present disclosure includes indium tin oxide and conducting polymers.

Non-limiting examples of chiral dopants which may be used in the present disclosure include R811, S811, R1011, S1011, R5011, and S5011 (available from Merck).

In some embodiments, the chiral dopant includes pairs of enantiomers.

The first voltage pulse and the second voltage pulse may have the same frequency or frequencies that are close to each other. Frequencies are considered close to each other when their difference is from 0 to 2000 Hz. In some embodiments, the difference in frequencies is in the range of from 0 to 1500 Hz, including from 0 to 1000 Hz, from 0 to 500 Hz, from 0 to 250 Hz, from 0 to 100 Hz, from 0 to 75 Hz, from 0 to 50 Hz, from 0 to 40 Hz, from 0 to 30 Hz, from 0 to 20 Hz, from 0 to 15 Hz, from 0 to 12 Hz, from 0 to 10 Hz, from 0 to 9 Hz, from 0 to 8 Hz, from 0 to 7 Hz, from 0 to 6 Hz, from 0 to 5 Hz, from 0 to 4 Hz, from 0 to 3 Hz, from 0 to 2 Hz, and from 0 to 1 Hz.

The liquid crystal may have twist and bend elastic constants which are equal to each other or close to each other. Twist and bend elastic constants are considered close to each other when their relative difference is less than 30%. In some embodiments, the difference is less than 25%, including less than 20%, less than 15%, less than 10%, less than 5%, less than 4%, less than 3%, less than 2%, and less than 1%.

The elastic constant adjuster may have a small bend elastic constant. The small bend elastic constant may be less than 130% of the twist elastic constant in some embodiments.

In some embodiments, the alignment layer(s) include a polyimide, poly(vinyl alcohol), and/or poly(methyl methacrylate).

Methods which use a bistable cholesteric liquid crystal switchable window are also disclosed. One non-limiting example of a method includes: applying a first voltage to the window; turning off the first voltage; and applying a second voltage to the window;

The application of the first voltage changes the window from a first transparent or reflective state to an opaque state. The application of the second voltage changes the window from the opaque state to a second transparent or reflective state.

The first voltage and the second voltage are the same or different. The first voltage is applied at a first frequency. The second voltage is applied at a second frequency. An absolute value of the difference between the first frequency and the second frequency may be less than 2000 Hz.

In some embodiments, the first voltage is in the range of from about 10 to about 70 V, including from about 20 to about 60 V, from about 30 to about 50 V, from about 35 to about 45 V, and about 40 V. In other embodiments, the first voltage is in the range of from about 40 to about 120 V, including from about 50 to about 110 V, from about 60 to about 100 V, from about 70 to about 90 V, from about 75 to about 85 V, and about 80 V.

In some embodiments, the second voltage is in the range of from about 40 to about 120 V, including from about 50 to about 110 V, from about 60 to about 100 V, from about 70 to about 90 V, from about 75 to about 85 V, and about 80 V. In other embodiments, the second voltage is in the range of from about 100 to about 180 V, including from about 110 to about 180 V, from about 120 to about 160 V, from about 130 to about 150 V, from about 135 to about 145 V, and about 140 V.

In some embodiments, a ratio of the first voltage to the second voltage is in the range of from about 0.1:1 to about 1:1, including from about 0.25:1 to about 0.75:1, from about 0.4:1 to about 0.6:1, from about 0.45:1 to about 0.55:1, and about 0.5:1. In other embodiments, the ratio is in the range of from about 0.2:1 to about 1.1:1, including from about 0.45:1 to about 0.7:1, from about 0.5:1 to about 0.65:1, form about 0.54:1 to about 0.6:1, and about 0.57:1.

In some embodiments, the first and second pulse widths are independently within the range of from about 0.1 to about 1 seconds, including from about 0.2 to about 0.8 seconds, from about 0.3 to about 0.7 seconds, from about 0.4 to about 0.6 seconds, from about 0.45 to about 0.55 seconds, and about 0.5 seconds.

In some embodiments, the first and second frequencies are independently in the range of from about 1 to about 120 Hz, including from about 5 to about 100 Hz, from about 10 to about 90 Hz, from about 25 to about 80 Hz, from about 40 to about 70 Hz, from about 50 to about 70 Hz, from about 55 to about 65 Hz, and about 60 Hz.

The following examples are provided to illustrate the devices and methods of the present disclosure. The examples are merely illustrative and are not intended to limit the disclosure to the materials, conditions, or process parameters set forth therein.

EXAMPLES

Example 1

An EMCLC was made by mixing 29 wt % CB7CB (dimer from HCCH) (1",7"-bis(4-cyanobiphenyl-4'-yl)heptane), 55 wt % BL038 (low molecular weight nematic liquid crystal mixture from Merck), and 16 wt % CB 15 (chiral dopant from Merck) ((S)-4-Cyano-4'-(2-methylbutyl)biphenyl). The mixture was used to fill a cell including two parallel glass substrates with indium-tin-oxide. (ITO) transparent electrode. The inner surface of the cell was coated with PI255 (from DuPont) (1% PI2555 in a thinning solvent) and rubbed. The cell thickness was controlled by 15 micron spacers.

Figure 2:
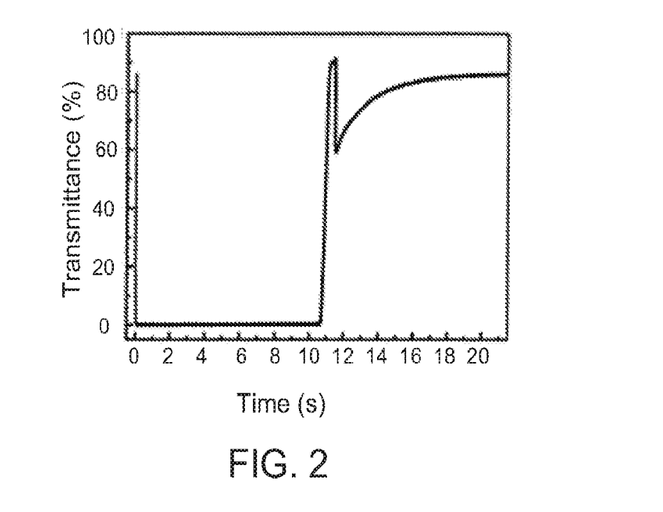
FIG. 2 is a graph of transmittance versus time for the switchable window of Example 1. The window included an alignment layer on each substrate.

A green laser was shined normally on the cell and a photo-diode was placed behind the cell to measure the transmittance of the cell. FIG. 2 shows the response of the cell to voltage pulses. The applied voltages pulses were 0.5 second wide and had the frequency of 60 Hz. Initially the window was in the transparent state with a high transmittance close to 90%. The light loss was mainly caused by the reflection from the glass-air interfaces. When a low voltage pulse of 40 V was applied, it was switched to the opaque focal conic state. The focal conic state had a low transmittance about 1%. After the pulse, the window remained in the opaque focal conic state. When a high voltage pulse of 79 V was applied, it was switched to the transparent homeotropic state. After the pulse, the window relaxed to transparent planar state with the high transmittance of 90%. It remained in the transparent state indefinitely long.

Example 2

An EMCLC was made by mixing 29 wt % CB7CB (dimer from HCCH), 55 wt % BL038 (nematic liquid crystal from Merck), and 16 wt % CBI5 (chiral dopant from Merck). The mixture filled a cell having two parallel glass substrates with indium-tin-oxide (ITO) transparent electrode. The inner surface of the cell had no alignment layer but was rubbed. The cell thickness was controlled by 15 micron spacers.

Figure 3:
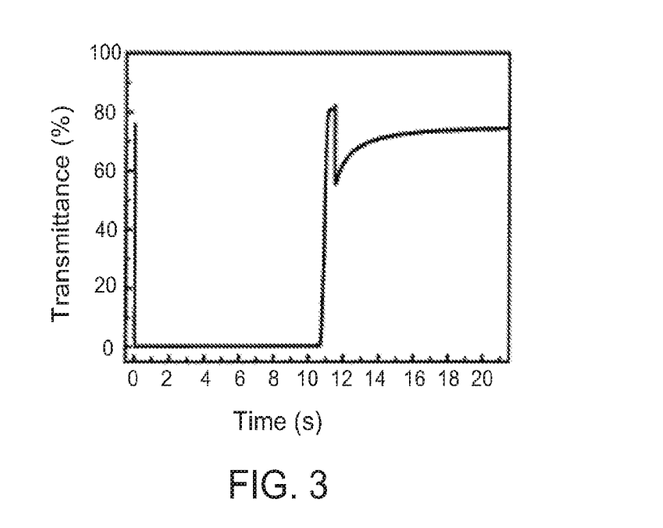
FIG. 3 is a graph of transmittance versus time for the switchable window of Example 2. The window did not include alignment layers.

A green laser was shined normally on the cell and a photo-diode was placed behind the cell to measure the transmittance of the cell. FIG. 3 shows the response of the cell to voltage pulses. The applied voltages pulse were 0.5 second wide and had the frequency of 60 Hz. Initially the window was in the transparent state with a high transmittance close to 77%. The light loss was mainly caused by the reflection from the glass-air interfaces. When a low voltage pulse of 40 V was applied, it was switched to the opaque focal conic state. The focal conic state had a low transmittance less than 1%. After the pulse, the window remained in the opaque focal conic state. When a high voltage pulse of 81 V was applied, it was switched to the transparent homeotorpic state. After the pulse, the window relaxed to transparent planar state with the high transmittance of 77%. It remained in the transparent state indefinitely long.

Example 3

An EMCLC was made by mixing 29 wt % CB7CB (dimer from HCCH), 55 wt % BL038 (nematic liquid crystal from Merck), and 16 wt % CB 15 (chiral dopant from Merck). The mixture filled a cell including two parallel glass substrates with indium-tin-oxide (ITO) transparent electrode. The inner surface of the cell was coated with PI255 (from DuPond) (0.1% PI2555 in a thinning solvent) and rubbed. The cell thickness was controlled by 25 micron spacers.

Figure 4:
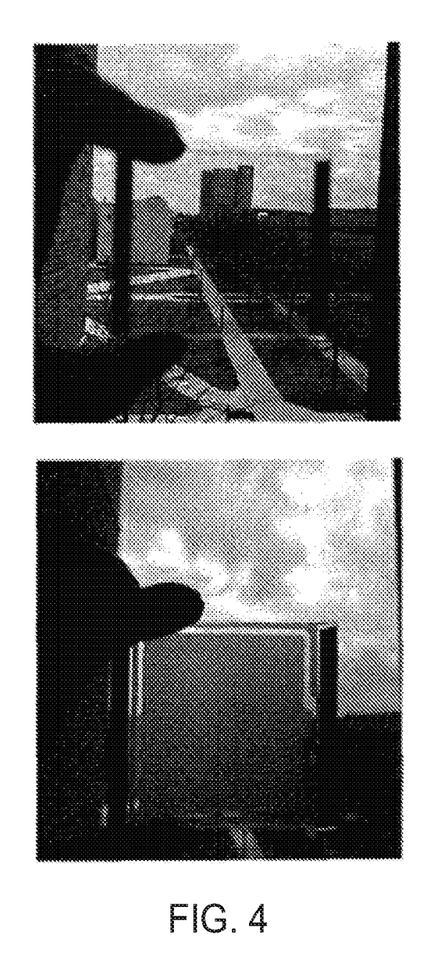
FIG. 4 includes photographs of the switchable window of Example 3 in a transparent state at 0 V (upper image) and in an opaque state at 0 V (lower image).

The bistable CLC switchable window was switched from the transparent planar state to the opaque focal conic state by applying a 0.5 second wide pulse of 80 V, and switched from the opaque focal conic state back to the transparent planar state by applying a 0.5 second wide pulse of 140 V. FIG. 4 shows the photographs of the bistable CLC switchable window. The upper image shows the window in the transparent state at 0 V. The lower image shows the window in the opaque state at 0 V.

The present disclosure has been described with reference to exemplary embodiments. Obviously, modifications and alternations will occur to others upon reading and understanding the preceding detailed description. It is intended that the present disclosure be construed as including all such modifications and alterations insofar as they come within the scope of the appended claims or the equivalents thereof.

The invention claimed is:

1. A bistable cholesteric liquid crystal switchable window having:
   two stable states in the absence of an applied voltage;
   wherein a first stable state is a planar state which is transparent or reflective for visible light;
   wherein a second stable state is a focal conic state which is opaque for visible light;
   wherein the bistable window can be switched from the first stable state to the second stable state by a first voltage pulse;
   wherein the bistable window can be switched from the second stable state to the first stable state by a second voltage pulse;
   wherein the first voltage pulse has a first frequency, the second voltage pulse has a second frequency, and an absolute value of the difference between the first frequency and the second frequency is less than 2000 Hz; and
   wherein the first voltage pulse has a first pulse width, the second voltage pulse has a second pulse width, and the first pulse width and the second pulse width are independently within the range of about 0.1 to about 1 seconds.

2. The bistable cholesteric liquid crystal switchable window of claim 1, comprising:
   a liquid crystal layer between two electrodes, wherein the liquid crystal layer comprises a liquid crystal.

3. The bistable cholesteric liquid crystal switchable window of claim 2, wherein the two electrodes are indium tin oxide electrodes.

4. The bistable cholesteric liquid crystal switchable window of claim 2, wherein the liquid crystal has twist and bend elastic constants which have a relative difference of less than 30%.

5. The bistable cholesteric liquid crystal switchable window of claim 2, wherein the liquid crystal layer further comprises an elastic constant adjuster and a chiral dopant.

6. The bistable cholesteric liquid crystal switchable window of claim 5, wherein the elastic constant adjuster is a dimer.

7. The bistable cholesteric liquid crystal switchable window of claim 6, wherein the dimer is 1" 7"-bis(4-cyanobiphenyl-4'-yl) heptane.

8. The bistable cholesteric liquid crystal switchable window of claim 5, wherein the elastic constant adjuster and the chiral dopant control the transmittance of the scattering focal conic state.

9. The bistable cholesteric liquid crystal switchable window of claim 5, wherein the elastic constant adjuster has a small bend elastic constant of less than 130% of the twist elastic constant.

10. The bistable cholesteric liquid crystal switchable window of claim 5, wherein the elastic constant adjuster is a liquid crystal with a bent molecular shape.

11. The bistable cholesteric liquid crystal switchable window of claim 5, wherein the elastic constant adjuster and the chiral dopant control the transmittance of the transparent planar state.

12. The bistable cholesteric liquid crystal switchable window of claim 2, further comprising alignment layers between the two electrodes and the liquid crystal layer.

13. The bistable cholesteric liquid crystal switchable window of claim 12, wherein the alignment layers comprise a polyimide.

14. The bistable cholesteric liquid crystal switchable window of claim 1, wherein the first pulse width and the second pulse width are the same.

15. The bistable cholesteric liquid crystal switchable window of claim 14, wherein the pulse width is about 0.5 seconds.

16. The bistable cholesteric liquid crystal switchable window of claim 2, wherein the liquid crystal layer comprises from about 45 wt % to about 65 wt % of the liquid crystal, from about 20 wt % to about 40 wt % of a dimer, and from about 5 wt % to about 25 wt % of a chiral dopant.

17. The bistable cholesteric liquid crystal switchable window of claim 2, wherein the liquid crystal layer comprises from about 50 wt % to about 60 wt % of the liquid crystal, from about 25 wt % to about 35 wt % of a dimer, and from about 10 wt % to about 20 wt % of a chiral dopant.

18. The bistable cholesteric liquid crystal switchable window of claim 2, wherein the liquid crystal layer comprises about 55 wt % of the liquid crystal, about 29 wt % of a dimer, and about 15 wt % of a chiral dopant.

19. The bistable cholesteric liquid crystal switchable window of claim 1, wherein the first voltage pulse and the second voltage pulse have different pulse widths.

20. A method for operating a bistable cholesteric liquid crystal switchable window comprising:
   applying a first voltage to the window;
   wherein the application of the first voltage changes the window from a first transparent or reflective state to an opaque state;
   turning off the first voltage; and
   applying a second voltage to the window;
   wherein the application of the second voltage changes the window from the opaque state to a second transparent or reflective state;
   wherein the first voltage and the second voltage are the same or different;
   wherein the first voltage is applied at a first frequency;
   wherein the second voltage is applied at a second frequency; and wherein an absolute value of the difference between the first frequency and the second frequency is less than 2000 Hz; and
   wherein the first voltage has a first pulse width, the second voltage has a second pulse width, and the first pulse width and the second pulse width are independently within the range of about 0.1 to about 1 seconds.

* * * * *